United States Patent [19]

Chamberlain

[11] 4,201,285
[45] May 6, 1980

[54] AUTOMATIC CORN CUTTER FEEDER

[75] Inventor: Neal C. Chamberlain, Hoopeston, Ill.

[73] Assignee: FMC Corporation, San Jose, Calif.

[21] Appl. No.: 705,374

[22] Filed: Jul. 14, 1976

[51] Int. Cl.² .............................................. B65G 47/24
[52] U.S. Cl. .................................... 198/400; 198/416
[58] Field of Search ........ 198/373, 382, 396, 398–400, 198/406, 416, 447, 534, 836, 601, 633, 434, 525, 452; 193/47, 32, 40; 271/223, 220; 214/6 D; 414/91

[56] References Cited

U.S. PATENT DOCUMENTS

| | | | |
|---|---|---|---|
| 2,160,557 | 5/1939 | Odell | 198/452 |
| 2,414,059 | 1/1947 | Powers | 214/6 D |
| 2,775,334 | 12/1956 | Jeremiah | 198/400 |
| 2,840,220 | 6/1958 | Antonelli | 198/406 |
| 2,995,366 | 8/1961 | Maidment | 271/220 |
| 3,156,343 | 11/1964 | Parlatore | 198/633 |
| 3,394,805 | 7/1968 | Ross et al. | 198/373 |
| 3,457,971 | 7/1969 | Maradyn | 214/6 D |

*Primary Examiner*—Joseph E. Valenza
*Attorney, Agent, or Firm*—John F. Verhoeven

[57] ABSTRACT

Husked ears of corn are fed individually between the flights of a forwardly moving flight conveyor and are supported by a rearwardly moving conveyor belt which spins the ears about their axes causing them to move in the direction of their axes until the smaller ends of the ears have moved close to or engage one of the side walls of the conveyor, depending upon which direction the ears are pointing. This forms two lanes of preoriented ears. At the delivery end of the preorienting conveyor, the ears are dropped with their axes generally parallel and horizontal and the ears of each lane fall against one side of a V shaped butt deflector which defects the following butts of the ears from each lane from vertical free fall but allows the smaller ends to continue to fall freely until they encounter the deflector. The ears now slide down a chute with their smaller ends forward and the side walls of the chute converge so as to singulate the ears from both lanes into a row of ears pointed small end first which row is picked up by a rearwardly moving cutter feeder conveyor.

The conveyor conducts the row of ears, which are now axially aligned pointed small end first, into a rotary corn cutter of a type well known in the art. In order to stabilize the ears and maintain their axes generally parallel until they fall against the butt deflector, light frictional engagement is made with the ears of each row, by a curtain of flexible chains hanging down at the delivery end of the preorienting conveyor.

6 Claims, 6 Drawing Figures

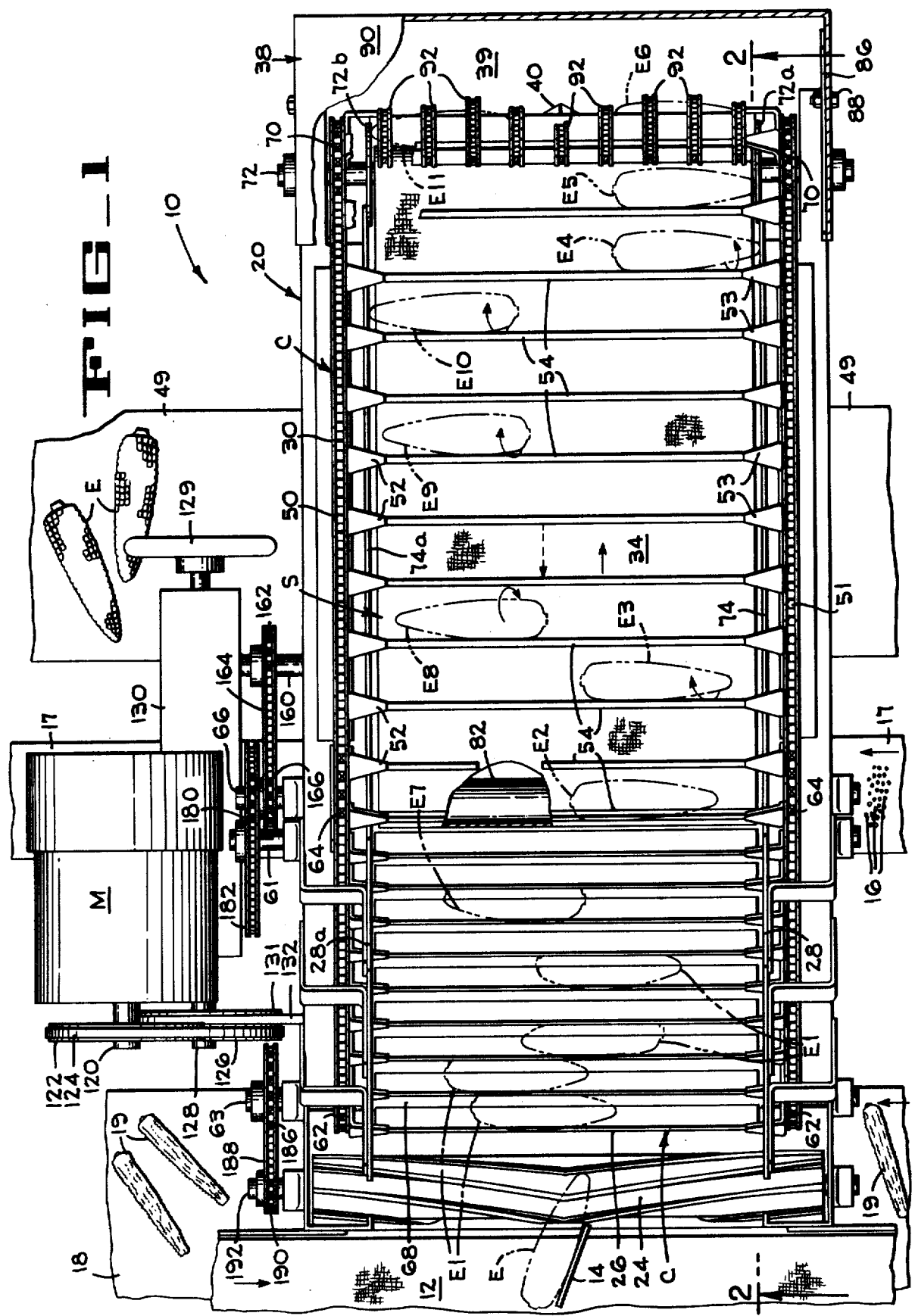

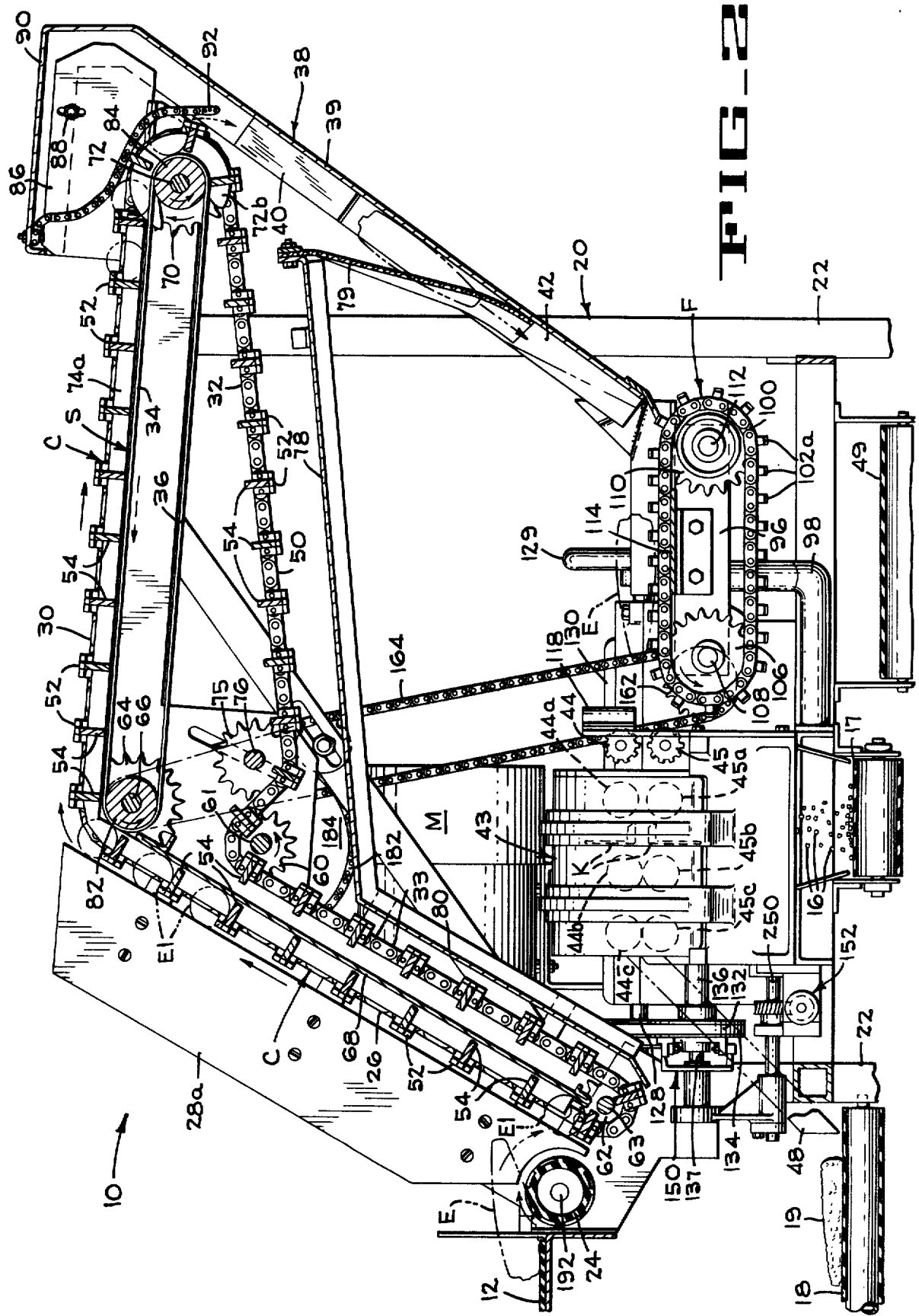

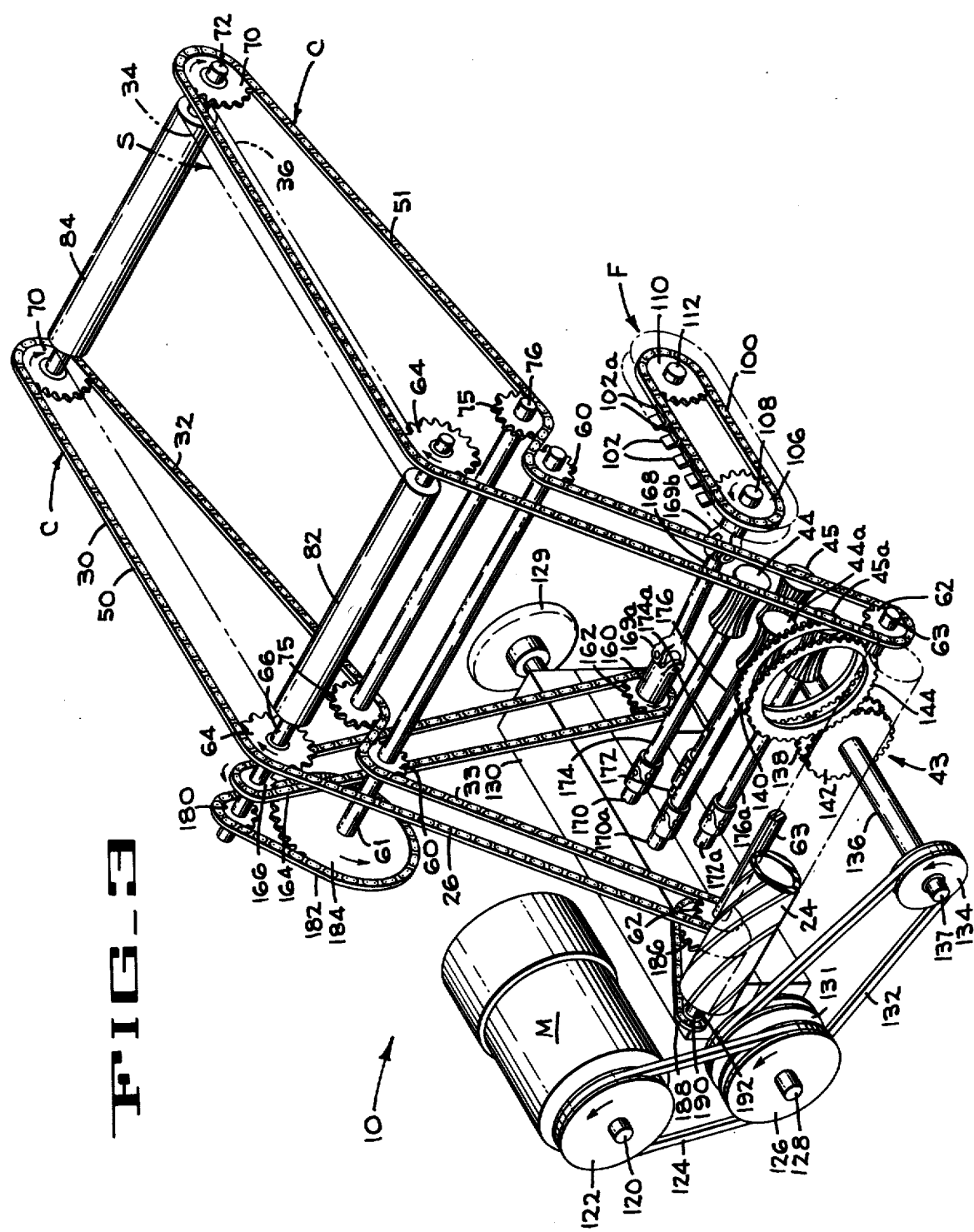

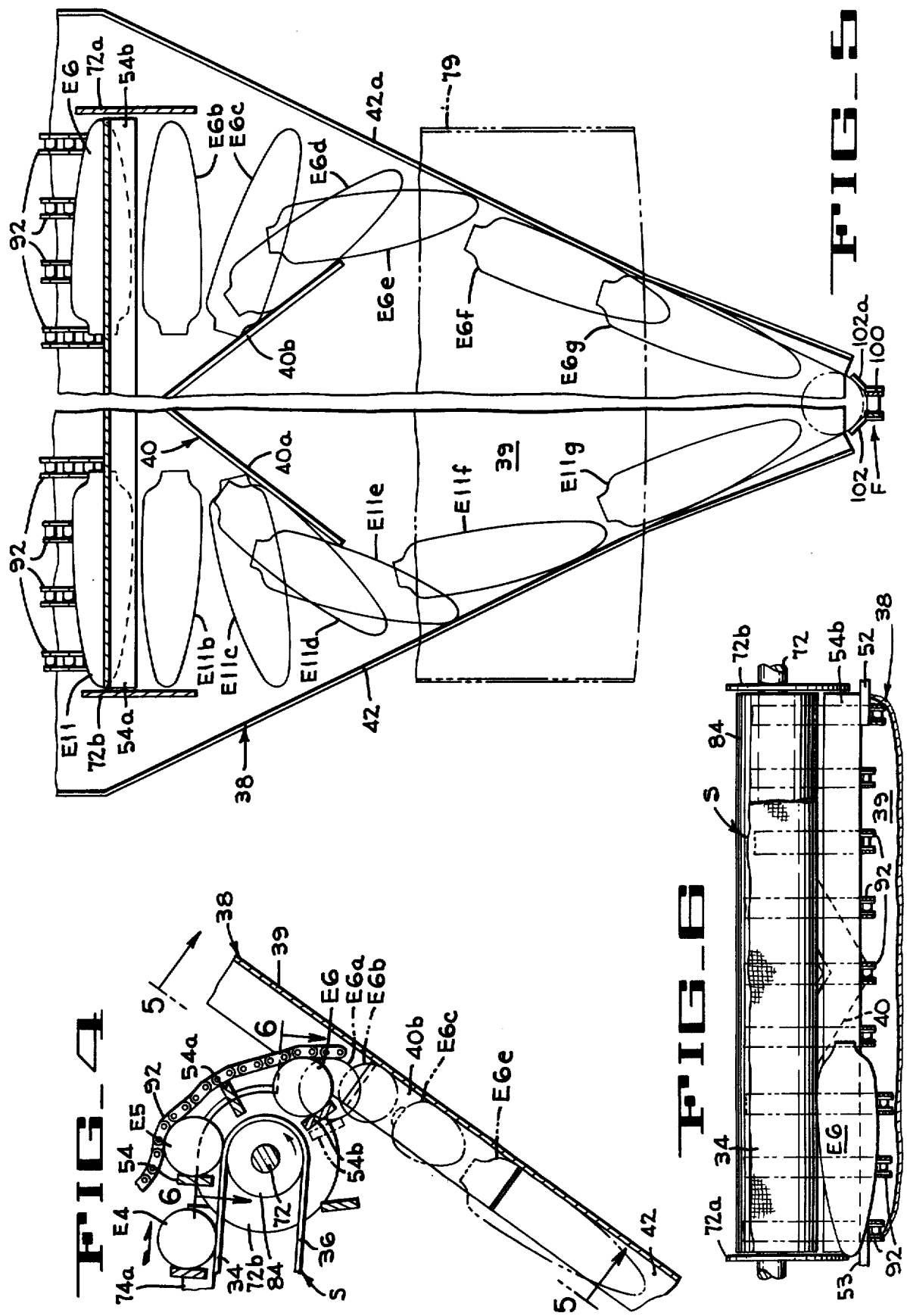

AUTOMATIC CORN CUTTER FEEDER

SUMMARY OF THE INVENTION

1. Field of the Invention

This invention relates to the automatic feeding and assorting of solid objects and more particularly to the orienting of husked ears of corn from random disposition into a single row of ears whose axes are aligned, with their small ends all pointing in the same direction for feeding the ears through a rotary corn cutter or the like.

2. Description of Prior Art

The apparatus of the present invention is an improvement in the tapered agricultural product orienting and feeding apparatus shown in the patent to Ross et al U.S. Pat. No. 3,394,805 issued July 30, 1968. In the aforesaid Ross et al patent, randomly disposed ears of corn are first fed to an elevating metering conveyor and are dropped into a chute onto a feed roller. The feed roller feeds the ears to an elevating section of a flight conveyor which has flights that are spaced apart by a distance that somewhat exceeds the diameter of the ears. The ears are thus singulated so that one ear is disposed between adjacent flights and are run over a table top conveyor which urges all of the ears to one side of an orienting conveyor, regardless of the direction in which the ears are pointed. The orienting conveyor is a continuation of the flight conveyor but the support for the ears is a rearwardly moving ear spinning belt which causes the ears to spin about their axes and move axially with their pointed ends at opposite sides of the conveyor and their butt ends at a mid-portion of the conveyor. This forms the ears into two lanes with the ears pointed in opposite directions in each lane. The ears of one lane slide sidewise down a rearwardly inclined table while passing over a conveyor that completes the movement of the ears in that lane in the desired direction. This lane of ears falls onto a corn cutter conveyor which runs transversely of the orienting conveyor. The ears of the other lane slide down the table to a turn around mechanism (FIG. 4) which turns the ears 180° so that they point in the same direction as the ears of the other lane and as a result, all of the ears on the transversely running corn feeder conveyor are axially aligned and running in the same direction.

FIG. 9 of the Ross et al patent shows a modification wherein the ears are first urged toward the center of the flight conveyor by oppositely running belts and are then spun and oriented as before. At the delivery end of the pre-orienting conveyor, the ears of the two lanes are each turned 90° so that they are deposited on a corn cutter feeder conveyor, all pointing in the same direction with the feeder conveyor forming a continuation of the orienting conveyor. Other modifications of the Ross et al cutter deposits the ears from the orienting conveyor as two discrete lanes which move in opposite directions to two corn cutters.

The patent to Ajero U.S. Pat. No. 3,811,550, May 21, 1974, discloses apparatus for orienting tapered articles, such as ears of corn, wherein the ears are delivered at random by a supply belt and are transferred by a transverse intake belt to a V shaped diverter. The diverter splits the incoming ears into two lanes that are received by a feed roll. The feed roll delivers the two lanes to an elevator belt which has cleats, and the ears in each lane are randomly oriented endwise. The two lanes of randomly oriented ears are dropped off the upper end of the elevator belt onto the descending side of a rotating orienting cylinder. The randomly oriented ears in each lane are carried downward by the descending surface of the orienting cylinder and gravitate to a gravity biased, curved traction plate which is spaced from the descending surface of the orienting cylinder with its axis parallel to that of the cylinder. When an ear of corn on the orienting cylinder reaches the traction plate, the larger end of the ear is momentarily engaged or "pinched" between the descending surface of the orienting cylinder and the traction plate. The surface of the cylinder is roughened so that the larger end of the ear will be carried downward by the descending surface while so engaged.

As the ear is mechanically carried downward by the descending outer surface of the cylinder the traction plate is forced outwardly until the spacing between the cylinder surface and the traction plate equals the maximum ear thickness, which is usually adjacent the butt end of the ear. At this time the smaller end of the ear is free to gravitate downwardly through the space between the descending surface and the traction plate so that the smaller end of the ear is extending downwardly before the butt end if released from between the opposed descending surface and the plate. To summarize, in the Ajero patent, the ears in a lane of randomly oriented ears, whose axes are initially horizontal, are oriented so that their smaller ends point down in a single orienting step which involves pinching the ears at their maximum thickness and allowing the ears thus pinched to hang down, smaller ends first, by what can be termed a "pendulum" effect.

The patent to Woodbury et al U.S. Pat. No. 2,419,242, issued Apr. 22, 1947 is directed to a cartridge feeder and orienter. Cartridges, all of which have the same length, are fed into a hopper and span the space between opposed side walls 14 of the hopper, in random end to end orientation. The floor of the hopper is lifted by fingers on thin, laterally spaced rotary plates, which fingers extract a single cartridge from the hopper and cause the cartridges to force open a spring loaded hinged gate 17 so that the cartridges, the smaller ends of which are randomly oriented, slide down a chute with the opposite ends of each cartridge initially disposed adjacent the side walls of the chute. Orienting lugs 16 project a short distance inwardly in from each side wall of the chute, and are spaced from the bottom of the chute such that they will clear the bullet end of the cartridge but not the primer end, thus after the lowermost cartridge has been pushed through the spring loaded gate, it slides down the chute and the primer end engages one or the other of the lugs 16, causing each cartridge to slide bullet end first, regardless of its previous orientation, after the bullet end passes under the associated lug 16 on one side of the chute or the other. A similar construction is shown in a modified form of this patent, wherein rotary fingers push the randomly oriented cartridges through a front wall of the hopper that has beveled restrictions that will pass the bullet end of the hopper but will not pass the primer end. The cartridge is thus pushed down the chute in oriented position against the restraining action of wire springs.

The patent to Gleason et al U.S. Pat. No. 3,212,668 Oct. 19, 1965, discloses apparatus for orienting objects such as bottles. The bottles are dropped down a vertical confining chute and those with their neck ends down encounter a loop which catches the neck and allows the bottom of the bottle to swing in an arc and fall back into a vertical confining chute, with the neck end of the bottle up and its bottom end down. Those bottles that fall down the delivery chute with the bottoms down initially, do not have their necks trapped by the loop, rather the bottoms of the bottles merely slide over the loop and the bottles slide back into the vertical descending chute with their bottoms still down.

SUMMARY OF THE INVENTION

The automatic corn cutting feeder of the present invention provides orientation of the ears in two discrete and successive steps. First, randomly oriented ears are progressively preoriented to form two lanes with the ears in each lane preoriented so that their smaller ends all point in the same direction. The ears of each lane are then dropped, with their axes generally horizontal for free fall onto a V shaped butt deflector. The butts of the ears of each lane strike and slide down one angled side of the butt deflector while the smaller ends continue to fall free. As the butts slide down the deflector, the smaller ends fall against the deflector ahead of the butts. The ears then slide axially down the deflector and are guided by an opposed chute wall so that their final orientation, smaller ends first, is completed. It is not essential that the axes of the ears be exactly horizontal as they fall to the deflector because the butts will engage the deflector first and the aforesaid final orientation will take place. As the ears fall free of the pre-orienting conveyor any tendency of the ear to be flung askew and hang up in the chute is damped by a curtain of flexible chains which engage the ears as they drop off the preorienting conveyor.

The preferred preorienting apparatus embodies some of the preorienting features of the aforesaid Ross et al U.S. Pat. No. 3,394,805, but the apparatus of the present invention is simpler than the various embodiments disclosed in the Ross et al patent, is more compact, but still produces two lanes of ears, with the ears in each lane having their smaller ends all pointing in the same direction, and after the aforesaid final orientation, a single row of axially aligned ears flows rearwardly, smaller end first, under the preorienting conveyor to a conventional corn cutter. This minimizes the floor space required for the apparatus. All this is accomplished without the need for mechanical ear turning devices, such as those shown in those modifications of the Ross et al patent wherein the ears are singulated into a single row. Even in these modifications of Ross et al, the cutter conveyor runs either transversely of the pre-orienting conveyor or forms a continuation thereof, both of which constructions require additional floor space.

The apparatus of the present invention comprises an elevator feeder for receiving the ears at random and feeding them between the forwardly moving flights of a generally horizontal preorienting conveyor. The preorienting conveyor has laterally spaced side walls and a rearwardly moving ear supporting and spinning belt, such as that of the Ross et al patent. As they are advanced by the flights, the spinning ears are shifted along their axes into two lanes with the smaller ends of the ears in each lane disposed at or adjacent to one of the side walls of the pre-orienting conveyor.

The delivery end of the pre-orienting conveyor drops the preorienting ears of each lane for gravity fall, with their axes disposed generally horizontally, onto a slide plate. The slide plate has an angular or V-shaped butt deflector adjacent the mid-portion thereof, with one angled side of the deflector deflecting the butt end of the falling ears of the associated lane from its vertical falling path, while the smaller ends from each lane continue to fall freely until they encounter the deflector. The ears then slide down the deflector plate with their smaller ends ahead of the butt ends. The butt deflector will deflect the butt ends of both long and short ears and since the ears are pre-oriented before falling it is not essential that the ears in each lane be of the same length with their opposite ends closely adjacent both side walls of a chute, as in the aforesaid Woodbury et al patent.

The slide plate is inclined downwardly and rearwardly under the preorienting conveyor and it has side walls which converge to direct the ears, after deflection by the butt deflector, into a single row with their smaller ends pointed down and rearwardly, the finally oriented ears are presented in an end-to-end file, smaller ends first, to a corn cutter conveyor that runs rearwardly and is disposed under the pre-orienting conveyor. Thus, the entire apparatus is compact in that it only occupies the floor space required for the elevating and preorienting conveyor and yet forms the ears into a single row for feeding a single corn cutter.

Preferably the motion of the ears is damped and the ears are prevented from becoming skewed in the horizontal plane, as they are dropped from the delivery end of the preorienting conveyor for free fall to the butt deflector. This is accomplished by providing one or more hanging flexible elements which lightly engage the ears of each lane at various zones along their lengths and hence stabilize the ears as they fall off a flight which is supporting them at the time of fall. In the preferred embodiment of the invention, the stabilizing means for each lane is a row or curtain of flexible chains draped down over the delivery end of the preorienting conveyor flights. No moveable ear turning devices, such as those shown in FIGS. 4–9 of the aforesaid Ross et al patent are required, and yet the ears are all delivered to a single conveyor that runs longitudinally and rearwardly under the preorienting conveyor for delivery to a corn cutter, as previously mentioned.

BRIEF DESCRIPTION OF THE DRAWINGS

FIG. 1 is a plan view of a feeder embodying the invention.

FIG. 2 is a section taken on line 2—2 of FIG. 1.

FIG. 3 is a diagramatic perspective view of the drive mechanisms.

FIG. 4 is a diagramatic side elevation operational view at the delivery end of the flight conveyor.

FIG. 5 is a synthesized diagramatic operational view looking along line 5—5 of FIG. 4, with the cutter feeder conveyor included for clarity of explanation.

FIG. 6 is an operational view looking along line 6—6 of FIG. 4.

GENERAL DESCRIPTION OF THE APPARATUS

Referring to FIGS. 1 and 2, the corn cutter feeder of the present invention is designated generally at 10. In many installations, more than one of these feeders is provided where they are aligned in a row and fed with husked ears of corn E by a feeder conveyor 12. At each feeder 10 a diverter construction, such as the element 14 illustrated in FIG. 1, which diverts a certain percentage of the incoming ears on the conveyor 12 into the feeder 10. As seen in FIGS. 1 and 2, the kernels 16 of corn cut from the ears drop out of the cutter housing and are carried away by a delivery conveyor 17 which removes the cut kernels for processing. A take-away conveyor 18 removes the cobs 19, from which the kernels have been cut.

The feeder 10 has a framework illustrated generally at 20 which includes frame and leg structure 22 for supporting the feeder on the floor. The ears E are introduced to the feeder from the conveyor 12 by a rubber covered, ribbed roller 24 which feeds into a flight conveyor indicated generally at C. The flight conveyor C has an elevating reach 26 bounded by right and left side rails 28,28a, a slightly downwardly inclined pre-orienting reach 30 and an angled return reach 32, 33.

Beneath the pre-orienting reach 30 of the flight conveyor C is a pre-orienting or spinning belt, indicated generally at S, and having an upper spinning reach 34, which moves rearwardly and oppositely to the forward motion of the pre-orienting reach 30 of the flight conveyor C, as in the Ross et al U.S. Pat. No. 3,394,805. The belt S has a return reach 36. Along the pre-orienting reach 30, the ears of corn are formed in two lanes with the smaller ends of the ears of each lane on the outside (FIG. 1). The pre oriented ears are dropped off the end of conveyor C and the belt S onto a final orienter indicated generally at 38. The final orienter 38 includes a slide plate 39 which mounts a V shaped butt deflector 40, best seen in FIG. 5, and which will be described in detail presently.

The butt deflector 40 initiates the final orientation which causes the ears of each lane to slide small ends first down a chute formed by the plate 39 and converging walls 42, 42a (FIG. 5) onto a feeder conveyor F. The conveyor F feeds the ears small end first to a corn cutter assembly 43 having main cutting knives K. In order to assist the feeding of the ears from the conveyor F into the corn cutter, two sets of driven feed rollers are disposed ahead of the main cutter knives K. As seen in FIG. 2, these include an upper entrance roller 44 and an opposed lower entrance roller 45 is disposed in front of the corn cutter 43, which rollers may control a jam clearing reversing system, forming the subject matter of the application of Chorney, Ser. No. 707,801, filed July 22, 1976, assigned to the FMC Corporation. A second set of feed rollers 44a, 45a are connected to a cutter knife control system which is not critical to the present invention and which is described in detail in the aforesaid Chorney application. Other sets of feed rollers 44b, 45b and 44c, 45c are provided at the delivery ends of the knives K.

The corn cutter 43 and the drive for the feed rollers are of a known commercial design, such as the Model 3AR corn cutter manufactured by the FMC Corporation. The details of suitable cutters are shown in the U.S. Pat. No. to Kerr 2,323,092, June 29, 1943, Kerr 2,787,273, Apr. 2, 1957 and in Schmidt 2,034,993, Mar. 24, 1936. These cutters are manufactured so that they can have both kernal cutting knives and scraping knives. In the embodiment of the present invention being described, only the kernel cutting knives, shown at k in dotted lines of FIG. 2, are provided. The cobs delivered from the exit end of the cutter are disposed of in any convenient manner such as by a chute 48, shown partially in phantom in FIG. 2, that directs the cobs to the aforementioned takeaway conveyor 18. A conveyor 49 (FIG. 2) receives ears that may fall off the conveyor F and returns them to the feeder conveyor 12, in a manner known in the art.

The Flight Conveyor—Detailed Description

The flight conveyor C includes laterally spaced side chains 50,51 (FIG. 1). The side chains mount longitudinally spaced, opposed brackets 52,53 with flight bars 54 extending between the brackets. The details of the drives for flight conveyor C and for other units of the feeder will be described in detail later relative to FIG. 3.

Referring at this time principally to FIG. 2, the return reaches 32 of the side chains 50,51 of the conveyor C pass over spaced drive sprockets 60 keyed to a conveyor drive shaft 61, the drive for which will be explained presently relative to FIG. 3. From the drive sprockets 60 the return reach passes around spaced lower idler sprockets 62 keyed to a shaft 63, mounted in the frame and which drives the entrance roll 24, as will be explained.

The flight conveyor C then proceeds up along the aforesaid elevating reach 26 and each side chain passes over an idler sprocket 64 freely mounted on a driven shaft 66 which drives the belt S. Beneath the elevating reach 26 of the conveyor C is disposed a plate 68 (FIG. 2) which supports the ears of corn as they are pushed up the plate by the conveyor flight bars 54. The elevated ears are confined by the aforesaid side plates 28,28a.

The pre-orienting orienting flight 30 of the flight conveyor C runs between the idling sprockets 64 and a pair of laterally spaced idler sprockets 70 which run free on a shaft 72 that is also an idler shaft for the belt S. Along each side of the pre orienting reach 30 of the flight conveyor C are right and left side guide rails 74,74a (see FIG. 1) which are normally ultimately engaged by the smaller ends of the ears of corn as they are progressively pre-oriented in a manner to be described presently. Discs 72a and 72b are mounted on shaft 72 to form rotating continuations of side rails 74,74a. The return reach 32 of the flight conveyor runs from the idler sprockets 70 over spaced adjustable idler sprockets 75 on an adjustably mounted shaft 76, which provides the proper tension on the conveyor chains. Details of this adjustment are not critical to the present invention. From the adjustable idler sprockets 75 return reaches of the conveyor chains 50,51 return to the previously mentioned drive sprockets 60 that are keyed to the associated drive shaft 61.

Disposed beneath the return reach 32 of the conveyor is a generally horizontal but downwardly inclined trash receiving plate 78. The rear end of the plate 78 supports the upper end of a depending flexible sheet 79, which may be formed of rubberized canvas and which stabilizes the ears as they slide down the plate 39 (FIG. 2). The front end of the trash receiving plate 78 connects to a downwardly, more steeply inclined slide plate 80 (FIG. 2). These plates 78,80 prevent trash from falling on the conveyor F and the corn cutting mechanism 43, which are disposed beneath the return reach 32 of the conveyor C.

The Spinning Belt—Detailed Description

The spinning belt S is made of an endless length of flexible material, such as rubberized fabric, and has an upper, rearwardly moving spinning reach 34 and a lower, return reach 36 as previously described. The spinning belt S passes around a driving roller 82 fixed to the belt drive shaft 66, which shaft also mounts the idler sprockets 64 for the flight conveyor chains 50,51. The belt S also passes around an idler roller 84 that is fixed to the idler shaft 72, upon which the idler sprockets 70 for the flight conveyor chains 50,51 are freely mounted. Thus, rotation of the belt drive shaft 66 in the counterclockwise direction as viewed in FIG. 2, causes the upper or spinning reach 34 of the spinning belt S to move rearwardly and in a direction opposite to that of the forward motion of the flight bars 54 along the preorienting reach 30 of the flight conveyor C.

Final Orientation

As will be explained in more detail presently, the final orientation of the two lanes of ears being advanced by the flight conveyor C into the end relationship is obtained by dropping the ears while their axes are horizontally disposed onto the downwardly inclined plate 39 of the orienting assembly 38, which plate 39 mounts the V shaped butt deflector 40. The oriented ears then slide further down the plate 39 into the chute formed by sidewalls 42, 42a, with their small ends leading for delivery to the feeder conveyor F and on to the cutting head 43.

The final orienter assembly 38 is adjustably mounted on side plate 86 (FIG. 2) which form part of the frame structure of the unit by means of bolt and slot connections 88. The orienter 38 has a top flange 90 and secured to this flange is a row or curtain of chains 92 that extends across the full width of the conveyor. In the embodiment shown, there are nine chains 92 in the row. The curtain of chains 92 stabilize the preoriented ears of both lanes, as they fall from the preorienting conveyor C onto the final orienter assembly 38 toward the butt deflector 40. The chains maintain control of the falling ears so that they do not fly about and so that they fall from the preorienting conveyor C with their axes substantially horizontal.

Feeder Conveyor—Detailed Description

The feeding conveyor F is best seen in FIG. 2. It comprises a side plate frame structure 96 secured to the main frame by a bent post 98. The conveyor element is in the form of a chain 100, alternate links of which have opposed ear retaining fingers 102,102a that cooperate to form U-shaped cradles for the ears.

The chain 100 passes over a drive sprocket 106 on a drive shaft 108 and an idler sprocket 110 on an idler shaft 112. The upper reach of the chain is supported by a shoe 114 mounted on the frame plate 96. Opposed converging funnel plates 118 are mounted between the delivery end of the conveyor F and the entrance feed rollers 44,45 to guide the ears into a centered position relative to the cutter 43.

Detailed Description of the Drive

FIG. 3 is a schematic perspective showing the drive system for the units previously described. The drive motor M has a drive shaft 120 to which is keyed a V belt drive pulley 122. This pulley drives a V belt 124 trained around a driven pulley 126 which is keyed to a drive shaft 128 for a gear box 130. The gear box 130 is of known design and can be constructed in accordance with the principles of the aforesaid Kerr and Schmidt patents, the details of the drive members within the gear box not being critical to the present invention. At one end of the gear box is a handwheel 129 which provides for manual rotation of the drive shaft 128 for adjustment and testing purposes.

Affixed to the gear box shaft 128 and just inside the drive pulley 126 is a cutter head drive pulley 131 (also seen in FIG. 1) which drives a V belt 132 that is trained around a pulley 134 (see also FIG. 2). The pulley 134 drives a sleeve or hollow shaft 136 that rotates on a knife adjustment shaft 137 that normally rotates at the same speed as the hollow shaft 136. The sleeve 136 drives a small gear 138 (FIG. 3) that drives a knife mounting and driving ring gear assembly 140 which carries the pivots that mount the cutting knives K (not shown in FIG. 3). A knife adjusting gear 142 is mounted on shaft 137 and is normally driven at the same speed as the gear 138 by the pulley 134 and an adjusting cam assembly 150 (not shown in FIG. 3 but seen in FIG. 2), such as that shown in the Kerr U.S. Pat. No. 2,787,273 and in the aforesaid Chorney application. The gear 142 meshes with a knife adjustment ring gear 144.

The shaft 137, that telescopes within the hollow shaft 136, is driven by a combined adjustment cam and drive assembly 150 driven by the aforementioned pulley 134 (FIG. 2) and provides for a limited independent motion of the knife adjusting ring gear 144, due to a lost motion construction, during operation of the apparatus. This construction is similar to constructions shown in the aforesaid Kerr U.S. Pat. No. 2,787,2732 2,787,273 the details of a somewhat modified form of the lost motion construction is described in detail in the aforesaid copending application of Chorney Ser. No. 707,801. A manual adjustment, indicated generally at 252 in FIG. 2, is provided for independently rotating the knife adjusting ring gear 144 (FIG. 3) to determine the closed position of the cutting knives. Details of the cutting knife adjustment drive and its operation are not critical to the present invention and preferably the structure employed is like that disclosed in the aforesaid Chorney pending appliation but the principles of the drive are, as mentioned previously, also disclosed in the aforesaid Kerr, Schmidt and other patents and the mechanisms of these patents can be employed if desired.

Referring again to FIG. 3, the drive roller 82 for the spinning belt conveyor S is driven from a lower shaft 160 projecting from the gear box 130, a sprocket 162 on the shaft, a chain 164 and a sprocket 166 keyed to the aforementioned shaft 66 for the belt roller 82. These parts can also be seen in FIG. 1 and some of them appear in FIG. 2.

The aforesaid shaft 160 from the gear box 130 that drives the spinning conveyor belt S also drives the cutter feeder conveyor F. This drive is transmitted through an intermediate shaft 168 that is connected at one end by a universal joint 169a to the shaft 160 and at the other end by a universal joint 169b that drives the previously mentioned shaft 108 for the driving sprocket 106 of the feed conveyor F. The entrance feed rolls 44,45 are driven by gear box shafts 170,172 which intermediate drive shafts 174,176 for the feed rolls 44,45 through universal joints which accommodate relative vertical motion of the feed rolls 44,45 in response to the contour of the ears of corn. The second set of feed rolls 44a,45a are similarly driven by gear box shafts 170a,172a and intermediate shafts 174a,176a through universal joints.

In order to drive the chains 50,51 for the flight conveyor C, the driven shaft 66 that mounts the drive roller 82 for the spinning belt S and is driven by the sprocket 166. from the gear box 130, mounts an outer small sprocket 180. The sprocket 180 drives a chain 182 trained around a large sprocket 184, which is keyed to the conveyor drive shaft 61 previously described as rotating the drive sprockets 60 for the upper reaches of the chains 50,51.

The delivery roller 24 that receives ears of corn from the feed conveyor 12 (FIG. 1) is driven, as seen in FIGS. 1 and 3, from the shaft 63 that is keyed to the lower sprockets 62 forming part of the gearing for mounting the conveyor flight side chains 50,51 and hence the side chains drive the shaft 63. In order to drive the roller 24, a sprocket 186 is keyed to the far end of the shaft 63 and this sprocket drives a chain 188 and a sprocket 190 keyed to the shaft 192 that supports the roller 24 in the side plates of the machine.

In a preferred embodiment of the invention, typical speeds of the parts just described in connection with the diagram of FIG. 3 are as follows:

Feed Pulley 24, peripheral speed, 146 ft/min.
Flight conveyor C, linear speed, 42 ft/min.
Spinning belt S, linear speed, 140 ft/min.
Rollers 44,45 and 44a,45a, 500 rpm.
Cutting head ring gears 140,144, 1500rpm.

Operation

The operation of the cutter feeder of the present invention can be characterized as comprising five steps, as follows:

1. Ear Feeding

Ears of corn are diverted from a feed-in conveyor onto an elevating conveyor having flights, and ears are elevated between adjacent flight bars, with the ears being at random end to end orientation.

2. Preorientation of Ears

The flight conveyor carries the ears over a preorienting conveyor that includes a rearwardly running spinning belt. This causes the ears to spin as they advance, so that the ears shift along their axes in the direction of their smaller ends, to form two lanes of preoriented ears with the smaller ends of the ears in each lane disposed adjacent one of the side walls of the conveyor.

3. Ear Drop Off

As the ears are carried around the upwardly moving end of the spinning belt by the flight bars they first fall from the flight bar on the preorienting conveyor that had been pushing the ears onto the upper side of the flight bar ahead of it. They then roll down and fall off of the flight bar that is supporting them to a final orienting assembly including a slide plate and a V shaped butt deflector. The axes of the ears in each lane are substantially horizontal but even if the axis of a given ear were slightly tilted from the horizontal in one direction or the other, it would make no difference, because the drop off step does not produce final orientation. As the ears drop off, they are prevented from skewing and flying about by a curtain of damping chains which stabilize the falling ears and assist in maintaining the axes of the flling ears in a horizontal position.

4. First Stage of Final Orientation

When the ears leave the flight bars that were supporting them, their axes are disposed horizontally and they fall freely until the butts their the ears in each lane fall against one angled side or the other of a V shaped butt deflector. The butt deflector intercepts and deflects the butt ends of the falling ears while the small ends continue to fall freely until the entire ear is sliding down one of the angled sides of the butt deflector. This causes the small ends to lead the butt ends as the ears slide down on the other of the angled, diverging sideplates of the butt deflectors. The ears from the two lanes are not yet in end to end axial alignment.

5. Second Stage of Final Orientation

The ears are finally oriented into end to end relation, with their small ends leading, as they slide down the butt deflector and encounter a converging chute that leads downwardly from the butt deflector. Cooperation of the butt deflector and chute sidewalls causes the ears to be delivered small end first and in end axial alignment to the cutter feeder conveyor F, for entry between the feed rollers at the corn cutter.

Detailed Description of Operation

The above general description of the operation of the corn cutter feeder of the present invention will now be described in more detail, which description will include reference to specifically designated ears of corn, when deemed helpful for purposes of explanation.

Referring to FIGS. 1 and 2, an ear of corn designated as E is being diverted from the conveyor 12 to the delivery feed roller 24. The feed roller 24 acts to place ears between adjacent flights 54 of the flight conveyor C at the elevating section 26 of that conveyor. If doubles are introduced, between flight bars, the extra ear will either roll back down the elevating section or will be carried through the orienter and will ultimately drop off the feeder conveyor F onto the return conveyor 49. The space between adjacent flight bars 54 on the elevating section is occupied by randomly oriented ears indicated at E1. During their elevation the ears between flights 54 are supported by the plate 68 (FIG. 2).

The randomly oriented ears E1 are delivered by the elevating reach 26 of the conveyor C to the upper reach 34 of the spinning or pre orienting belt conveyor S. As indicated by the arrows in FIGS. 1 and 2, the upper reach of the spinning belt (dashed arrow) moves rearwardly, in a direction opposite to the forward motion of the flight bars 54 (solid arrow) of the conveyor C.

Referring to FIG. 1, an ear E2 has just been deposited on the rearwardly moving pre-orienting orienting belt S with its smaller end pointing towards the side rail 74, which would be the right hand side rail as viewed from the front or ear receiving end of the conveyor C. As the ears on the upper reach 34 of the pre orienting conveyor belt S are advanced by their respective flight bars, they are caused to spin about their axes and an ear, such as the ear E3 of FIG. 1, the small end of which points towards the right side rail 74, is spun about its axis and moves axially along the flight bar 54 so that its smaller end approaches the side rail 74.

The ears E4 and E5 in FIG. 1 are being pushed along the rearwardly moving reach 34 of the spinning belt S by their associated flight bars 54 and have been completely pre-oriented in that the smaller end of ear E4 has been brought against the right hand side rail 74 and the smaller end of ear E5 is against the rotating disc 72a.

As is also seen in FIG. 1, the ears E8–E11 are being pre-oriented into a left hand lane with their smaller ends normally reaching the left side rail 74a and rotating disc 72b.

The ear E6 in the right hand lane of the preorienting conveyor is in the process of being dropped from that conveyor and the motions of this ear will be followed step by step in a detailed description of FIGS. 4–6 to follow.

The ear E6 was originally pushed along the spinning and pre-orienting belt S by the conveyor flight 54a (FIG. 4) but as this ear is pushed around the end of the belt, it drops by gravity from its previous point of pushed engagement (not shown) with the flight 54a to the flight 54b ahead of it. The dropped position of the ear E6 on flight 54b is illustrated in FIG. 4 as well as at the right of FIG. 5 and the left of FIG. 6. During this dropping motion of the ear E6 from the pushing flight 54a to the supporting flight 54b ahead of it, the ear E6 was stabilized by the curtain of chains 92. Not only do the chains 92 stabilize the ears and prevent them from flying about and from becoming skewed in the horizontal plane as they fall, they cause the axes of the ears to remain substantially horizontal as the ears fall and slide along the chains from the position of the ear E5 of FIG. 4 to the positions of the ear E6, as shown in FIGS. 4–6. In the latter position, the ear E6 has cleared all but the extreme end of the chains 92 and is freely rolling down the ear supporting flight 54b (FIG. 4) towards the slanting plate 39 of the final orienting device 38, as shown at the position E6a. As the ear at E6a continues to roll along the flight bar 54b, the flight bar moves clear of the ear and the ear falls free, with its axis horizontally disposed, from the position E6a to the position E6b, shown in FIGS. 4 and 5. In the latter position, the ear E6b is resting against the slanting plate 39 and as seen in FIG. 5, the axis of the ear E6b remains horizontal as it falls freely towards the angled plate or wing 40b of the butt deflector 40.

Just before the ear E6b reaches the position E6c, the extreme butt of the ear will have engaged and deflected the wing 40b of the butt deflector 40 with the smaller end of the ear still falling free. The wing 40b partially retards the fall of the butt end while the remainder of the ear, including its major diameter portion and its smaller end continue to fall without deflection by the butt deflector under the force of gravity. When the ear reaches a position E6d (FIG. 5) the smaller end of the ear is leading and the entire ear is sliding down the wing 40b of the butt deflector towards the chute side wall 42a of the final orienter 38. The ear slides down wing 40b to the position E6e of FIG. 5, where its small end encounters the side wall 42a of the plate 39. The ear then slides down the chute formed by plate 39 and side wall 42a as indicated by positions E6f and E6g in FIG. 5 and is delivered to the cradle formed by the fingers 102, 102a of the chain 100 of the cutter feeder conveyor F. The ears thus delivered to the conveyor F, as shown in FIG. 2, have their smaller ends first, are in axial alignment and they are singulated.

Referring back to FIG. 1, an ear E7 is shown near the upper end of the elevating reach 26 of the flight conveyor, and this ear is disposed with its smaller end pointed toward the left side rail 28a. Thus, in FIG. 1 the ear E8 is on the preorienting reach 30 of conveyor C and is being pushed along the rearwardly running reach 34 of the spinning belt S and hence the ear is being rotated about its axis. Thus the smaller end of the Ear 8 is moving axially toward the left hand side rail 74a of the pre-orienting conveyor C. The smaller end of the ear E9 (FIG. 1) has almost reached the side rail 74a and the smaller end of the ear E10 is in engagement with the side rail 74a. The leading ear E11 in the left lane will now roll down from its driving flight 54 to the flight 54a ahead.

FIG. 5 illustrates diagramatically the action that occurs with ears such as E11 in the left land of the pre-orienting conveyor. The figure is diagramatic in that the diagram is split down its center so that the conveyor flight bars are shown separately for each lane, with the flight bar 54a supporting the ear E11 being shown in the position of the flight bar 54b that supported the ear E6, as previously described. As previously explained, the space between adjacent flight bars is normally occupied by only one ear, but for purposes of illustration, the aforesaid convention has been adopted and the flight bars 54a, 54b are shown in coincidence, whereas actually there is a short time lag before the flight bar 54a, for the left lane, will reach the position of the flight bar 54b for the right lane as shown in FIG. 5. Thus, FIG. 5 shows the left ear E11 falling from its supporting flight bar 54a to its free falling position at E11b with the axis of the ear horizontal. The butt end of the ear strikes the wing 40a of the butt deflector at the position E11c, which corresponds to the previously described ear position E6c at the right lane. The small end of the ear continues to fall ahead of the butt end as shown in the positions of E11d and E11e with the small end of the ear E11e encountering the chute side wall 42. Positions E11f and E11g show the ear sliding, smaller end first, along the chute side wall 42 towards the corn cutter feeder conveyor F. It must be remembered that as seen in FIG. 1, only one ear is ordinarily disposed between adjacent flight bars 54. This means that the ears are deposited alternately from the right and left lanes to the positions shown in FIG. 5, and hence the ears reach the conveyor F one at a time. If there are two ears between a given pair of flight bars, one of them will ultimately fall off the cutter conveyor F onto the return conveyor 49.

Thus, to summarize it can be seen that the corn cutter feeder of the present invention first preorients the ears of corn into two lanes with the smaller ends of the ears in each lane pointing to the outside. The ears of the two lanes are then dropped alternately for free fall with their axes horizontal. The extreme butt ends of the ears of each line fall against and are deflected by an inclined wing of a V shaped butt deflector. This allows the smaller ends of the ears to slide freely down the slide plate 39 while the butt ends slide down the plate and their associated wings of the butt deflector, the result being that the smaller ends lead the butt ends, although each ear is continuously falling or sliding along a chute wall. The ears of the two lanes are alternately guided by a converging chute until they are singulated into end to butt position, smaller ends first. This singulated row of ears is received by a feeder conveyor for the corn cutter assemby. The final orientation of the ears, smaller ends first and with their axes in alignment takes place as the ears are picked up by the feeder conveyor F.

It has been found that this sequence of steps, including the preorienting of ears into lanes and dropping them for free fall against the inclined walls of a butt deflector, results in a higher percentage of properly oriented ears than devices which depend upon frictional engagement of the ears at a larger diameter portion thereof, for causing the ears to swing smaller end down while their largest diameter portions are frictionally restrained to act as pivots for the ears. So long as the ears are tapered (and normally all of them are) the preorienting conveyor (flight conveyor C and spinning belt S) is insensitive to the length of the ears, to the quantative difference between the largest diameter of the ear and its smallest diameter, and to the location of the largest diameter section of the ear relative to the center of gravity of the ear. The position of the center of gravity of the ears along their axes relative to that of their major diameter is not critical, because under the present invention, no "Pendulum" or "hang down" effect is relied upon for either preliminary or final orientation.

Another feature of the present invention is that the inclined orienting chute and its butt deflector extend from the rear (delivery end) of the pre-orienting conveyor downwardly and forwardly towards the front end of the machine. Also, the corn cutter feeder conveyor and the corn cutter assembly are disposed beneath the flight conveyor of the machine. These features reduce the floor space required for the basic machine, as opposed to a machine wherein the final orientation, feeding and cutting take place either on one side or the other of the machine or form a continuation of the direction of motion of the flight conveyor.

Although the best mode contemplated for carrying out the present invention has been herein shown and described, it will be apparent that modification and variation may be made without departing from what is regarded to be the subject matter of the invention as defined in the appended claims.

What I claim is:

1. A feeder for feeding tapered elongate articles of varying length, such as ears of corn, to processing apparatus such as a corn cutter; said feeder comprising means for feeding individual articles at random end to end orientation to a preorienting conveyor; said preorienting conveyor having laterally spaced side walls and comprising means for simultaneously advancing individual articles with their axes in generally parallel relation along a path normal to the axes of the articles while shifting the articles along their axes toward the side walls to form two lanes with the smaller ends of the articles in one lane pointing in a direction opposite to that of the smaller ends of the articles in the other lane, and with the articles in one lane being staggered longitudinally of their path relative to the articles in the other lane, means for successively dropping the preoriented articles of each lane from the delivery end of said preorienting conveyor for gravity fall while their axes are disposed generally horizontally, and a downwardly inclined slide plate for receiving said falling articles, the improvement wherein said slide plate has downwardly directed, angularly diverging deflector plates with the vertex of their angle of divergence being substantially at the midplane of said slide plate, said deflector plates successively intercepting one end portion of the articles of each lane while accommodating continued sliding motion of said one end portion along the deflector and slide plates, the other, non-intercepted end portion of each article sliding freely down the slide plate to a position below its intercepted end portion, said slide plate having converging side walls for deflecting said other ends of the articles toward the midplane of the slide plate as the articles slide down off said deflector plates, said converging sidewalls bringing the articles into single file, end to end orientation with the smaller ends pointing in the same direction, said slide plate having an uninterrupted surface for supporting the sliding articles during said orientation, and conveyor means for receiving the oriented articles of both lanes from a lower portion of the slide plate and delivering them in end to end relationship to processing apparatus.

2. A feeder for feeding husked ears of corn of varying length to a corn cutter; said feeder comprising means for feeding individual articles at random end to end orientation to a preorienting conveyor; said preorienting conveyor having laterally spaced side walls and comprising means for simultaneously advancing individual ears with their axes in generally parallel relation along a path normal to the axes of the ears while shifting the ears along their axes toward the side walls to form two lanes with the smaller ends of the ears in each lane disposed adjacent one of said side walls, and with the ears in one lane being staggered longitudinally of their path relative to the ears in the other lane, means for successively dropping the preoriented ears of each lane from the delivery end of said preorienting conveyor for gravity fall while their axes are disposed generally horizontally, and a downwardly inclined slide plate for receiving said falling articles; the improvement wherein said slide plate has downwardly directed, angularly diverging deflector plates with the vertex of their angle of divergence being substantially at the midplane of said slide plate, said deflector plates successively intercepting the butt end portion of each ear of each lane while accommodating continued sliding motion of the butt end portion along the deflector and slide plates, the non-intercepted smaller end portion of each ear sliding freely down the slide plate to a position below its butt end portion; said slide plate having converging sidewalls for deflecting the smaller end portions of the ears toward the midplane of the slide plate as the ears slide down off said deflector plates, said converging sidewalls bringing the ears into single file, end to end orientation with their smaller ends pointing forwardly, said slide plate having an uninterrupted surface for supporting the sliding ears during said orientation, and conveyor means for receiving the oriented articles of both lanes from a lower portion of the slide plate and delivering them in end to end relationship, smaller ends first to a corn cutter.

3. The feeder of claim 2, comprising ear guide means for lightly engaging the outer sides of the ears as they fall onto said slide plate for preventing skewing of the ears as they fall toward said butt deflector plates.

4. The feeder of claim 3, wherein said ear guide means comprises a row of freely depending chains supported at their upper ends.

5. The method of delivering ears of corn of varying lengths smaller end first to a processing device such as a corn cutter; said method comprising the steps of advancing individual ears with their axes generally parallel and shifting the ears axially during their advance against stop plates to form two lanes of ears with smaller ends of the ears in each lane pointing in the same direction and with the ears of one lane pointing oppositely to the ears of the other lane, the ears of one lane being longitudinally staggered relative to the ears of the other lane, and dropping the ears from each lane while their axes are substantially parallel for gravity fall to a downwardly inclined slide surface; the improvement comprising the steps of intercepting the butt end portions of the falling ears in each lane while allowing the smaller end portions to slide freely down said slide surface so that the smaller end portions lead the butt end portions, guiding the lower, smaller end portions of the ears of each lane along paths that converge toward the midplane of said slide surface while guiding the upper, butt end portions along divergent paths, thereafter continuing to guide the entire ears along said converging paths smaller ends first, guiding the ears from both lanes into end to end oriented relationship with their smaller ends leading, supporting the ears on said slide surface during said guiding steps and conveying the oriented ears end to end and in single file to a single processing device.

6. The method of claim 5, comprising the step of lightly pressing against the ears as they drop from each lane for maintaining their axes substantially horizontal during their free fall.

* * * * *